United States Patent
Hsu et al.

(10) Patent No.: US 10,142,967 B2
(45) Date of Patent: Nov. 27, 2018

(54) METHOD OF HANDLING RADIO RESOURCE

(71) Applicant: MEDIATEK INC., Hsin-Chu (TW)

(72) Inventors: Tsai-Yuan Hsu, Hsinchu County (TW); Shun-Yong Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/455,148

(22) Filed: Mar. 10, 2017

(65) Prior Publication Data

US 2018/0263018 A1     Sep. 13, 2018

(51) Int. Cl.
*H04W 72/04*     (2009.01)
*H04W 52/02*     (2009.01)
*H04L 29/06*     (2006.01)

(52) U.S. Cl.
CPC .............. *H04W 72/04* (2013.01); *H04L 69/22* (2013.01); *H04W 52/0235* (2013.01)

(58) Field of Classification Search
CPC .... H04W 72/04; H04W 52/0235; H04L 69/22
See application file for complete search history.

(56) References Cited

U.S. PATENT DOCUMENTS

| | | | |
|---|---|---|---|
| 2010/0020758 A1* | 1/2010 | Kim ................... | H04W 72/0446 370/329 |
| 2011/0019626 A1* | 1/2011 | Karaoguz ........... | H04L 43/0894 370/329 |
| 2013/0039200 A1* | 2/2013 | Park ..................... | H04W 16/14 370/252 |
| 2016/0037529 A1* | 2/2016 | Bourlas ................ | H04L 1/1861 370/329 |

* cited by examiner

*Primary Examiner* — Kashif Siddiqui
(74) *Attorney, Agent, or Firm* — Winston Hsu

(57) ABSTRACT

A method of handling a radio resource for a first communication device in a wireless communication system includes transmitting at least one notification frame to a second communication device, to indicate a radio resource rearrangement; applying the radio resource rearrangement; determining at least one radio resource threshold according to the radio resource rearrangement; receiving a packet from the second communication device and determining whether the second communication device applies the radio resource rearrangement according to the received packet and the at least one radio resource threshold; and performing a specific operation when determining the second communication device does not apply the radio resource rearrangement, to communicate with the second communication device via the rearranged radio resources.

6 Claims, 4 Drawing Sheets

METHOD OF HANDLING RADIO RESOURCE

BACKGROUND

The present invention relates to a method for a communication device in a wireless communication system, and more particularly, to a method of handling a radio resource for a communication device in a wireless communication system.

IEEE 802.11 is a set of media access control (MAC) and physical layer (PHY) specification for implementing wireless local area network (WLAN) communication in the unlicensed (2.4, 3.6, 5, and 60 GHz) frequency bands. The standards and amendments provide the basis for wireless network products using the unlicensed frequency bands. For example, IEEE 802.11ac is a wireless networking standard in the 802.11 family to provide high-throughput WLANs on the 5 GHz band. Significant wider channel bandwidths (20 MHz, 40 MHz, 80 MHz, and 160 MHz) were proposed in the IEEE 802.11ac standard.

When a first station (e.g. a router or an access point) communicates with a second station, the first station may adaptively rearrange radio resource of communications. For example, the first station may change a channel bandwidth from 80 MHz to 40 MHz and support rates to mitigate interference to other radios or adjust a number of spatial streams (i.e. the number of antennas) used for the communications. When the first station intends to rearrange the radio resource, the wireless networking standards in the 802.11 family specify the first station to notify the second station of the changed radio resource.

After notifying the changed radio resource, however, the first station cannot ascertain whether the second station successfully receives the notification and accordingly follows the radio resource rearrangement. If the second station does not obey the changed capability, the communications between the first station and the second station would fail. Furthermore, the first station would not acknowledge the communication failure because payloads of the transmitted packets from the second station cannot be decoded.

SUMMARY

In order to solve the above issue, the present disclosure provides a method of handling a radio resource for a communication device in a wireless communication system.

In an aspect, a method of handling a radio resource for a first communication device in a wireless communication system is disclosed. The method comprises transmitting at least one notification frame to a second communication device, to indicate a radio resource rearrangement; applying the radio resource rearrangement; determining at least one radio resource threshold according to the radio resource rearrangement; receiving a packet from the second communication device and determining whether the second communication device applies the radio resource rearrangement according to the received packet and the at least one radio resource threshold; and performing a specific operation when determining the second communication device does not apply the radio resource rearrangement, to communicate with the second communication device via the rearranged radio resources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
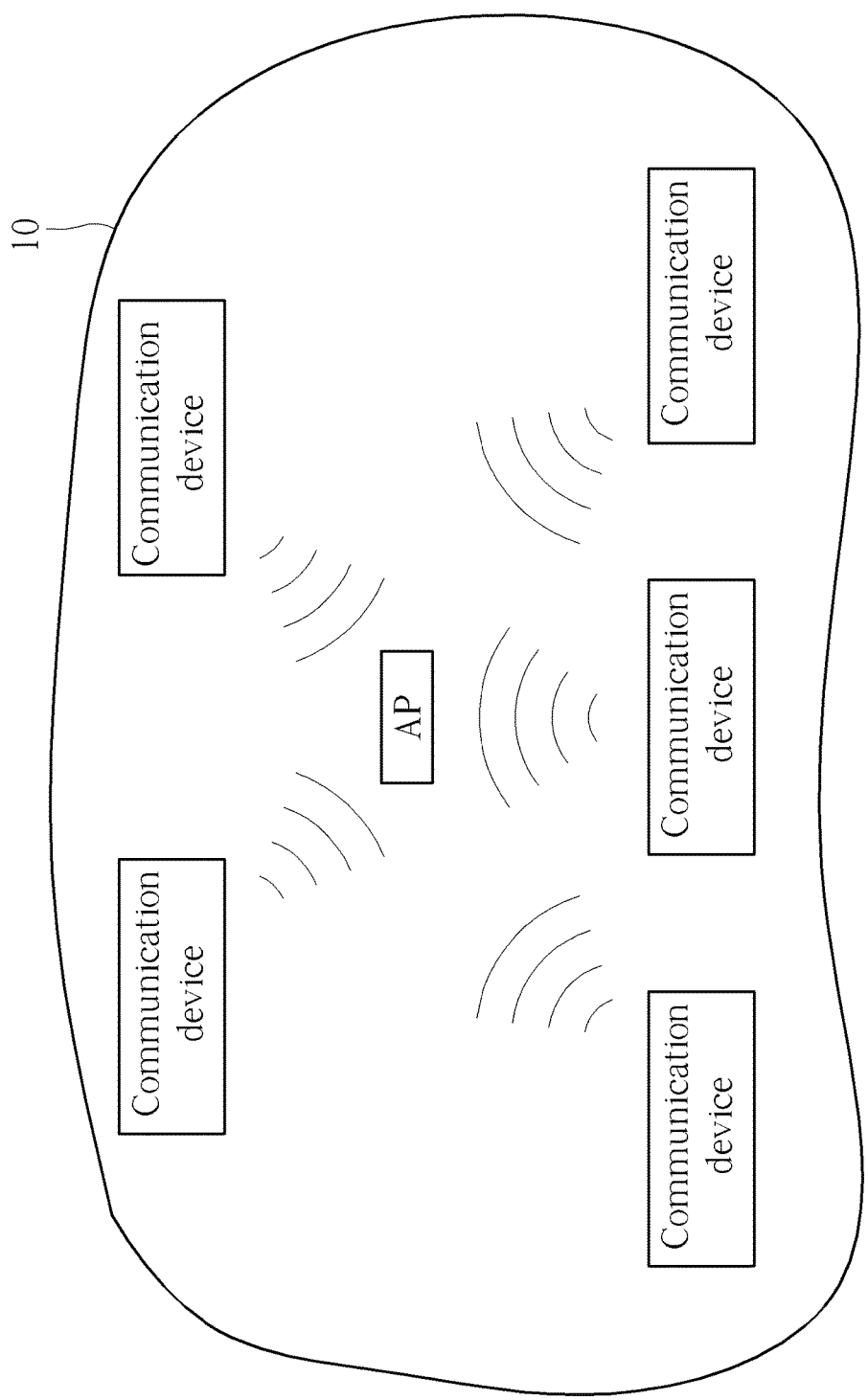
FIG. 1 is a schematic diagram of a wireless communication system according to an example of the present invention.

Please refer to FIG. 1, which is a schematic diagram of a wireless local area network (WLAN) communication system 10 according to an example of the present invention. The WLAN communication system 10 is briefly composed of a plurality of communication devices (i.e. stations), and one (or more) of the communication devices in this example, which controls communications, channel establishment, radio resource arrangement, etc. of other communication devices, is an access point (AP). The AP and the communication devices are simply utilized for illustrating the structure of the WLAN communication system 10, which is well known in the art.

The AP and the communication devices may be equipped with multiple antennas for performing beamforming, to realize massive multiple-input multiple-output (MIMO) or time-reversal division multiple access (TRDMA). That is, beam sectors may be formed by the antennas according to the massive MIMO or the TRDMA. Energy of the signals (e.g., received signals and/or transmitted signals) may be separated and focused within corresponding beam sectors. The communication devices may be divided into multiple groups of communication devices, and each group of communication devices belongs to a corresponding one of the beam sectors. Thus, advantage of spatial focusing effect may be provided to the communication devices, when the massive MIMO or the TRDMA is operated. It should be noted that complexity of a communication device may be further reduced if the AP performs a transmission to the communication device according to the TRDMA. For example, the communication device may need only one receive antenna to perform a reception from the network according to the TRDMA. According to the above description, multiple-user MIMO (MU-MIMO) is realized between the AP and the communication devices shown in FIG. 1.

Figure 2:
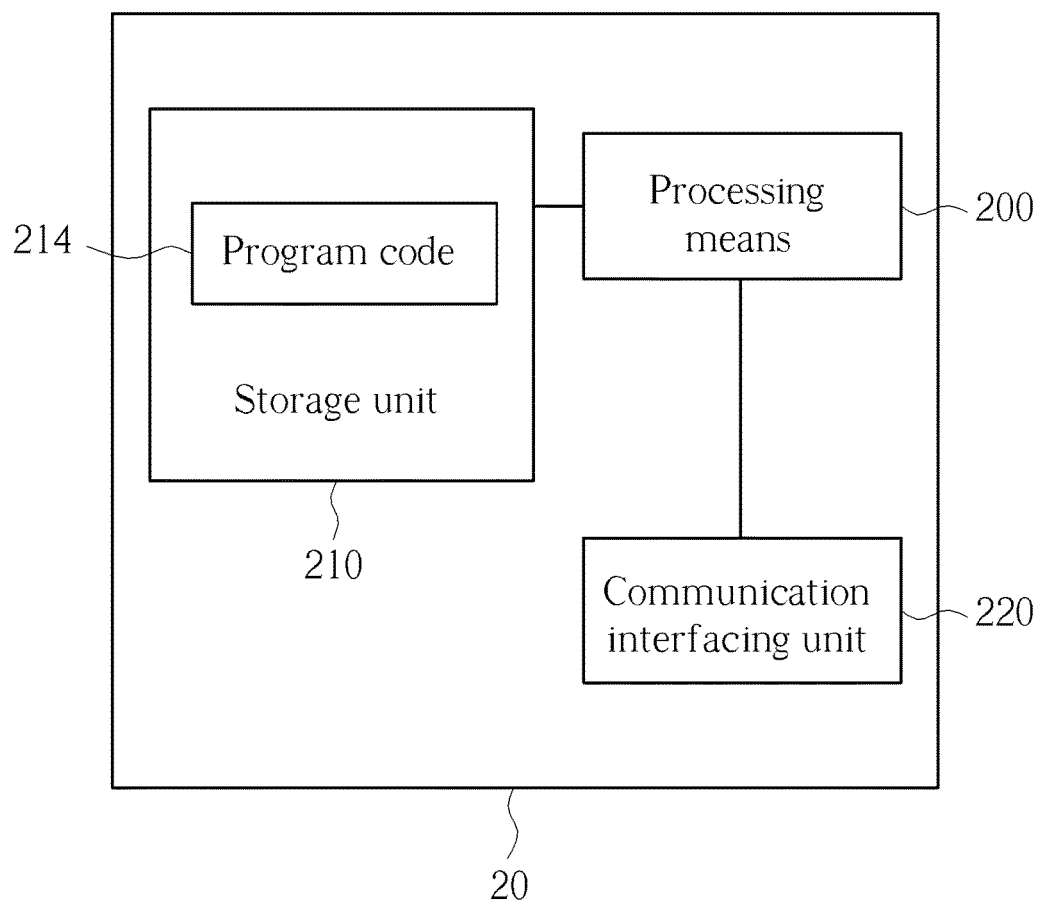
FIG. 2 is a schematic diagram of a communication device according to an example of the present invention.

FIG. 2 is a schematic diagram of a communication apparatus 20 according to an example of the present invention. The communication apparatus 20 may be the AP or any of the communication devices shown in FIG. 1, but is not limited herein. The communication apparatus 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Bluray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
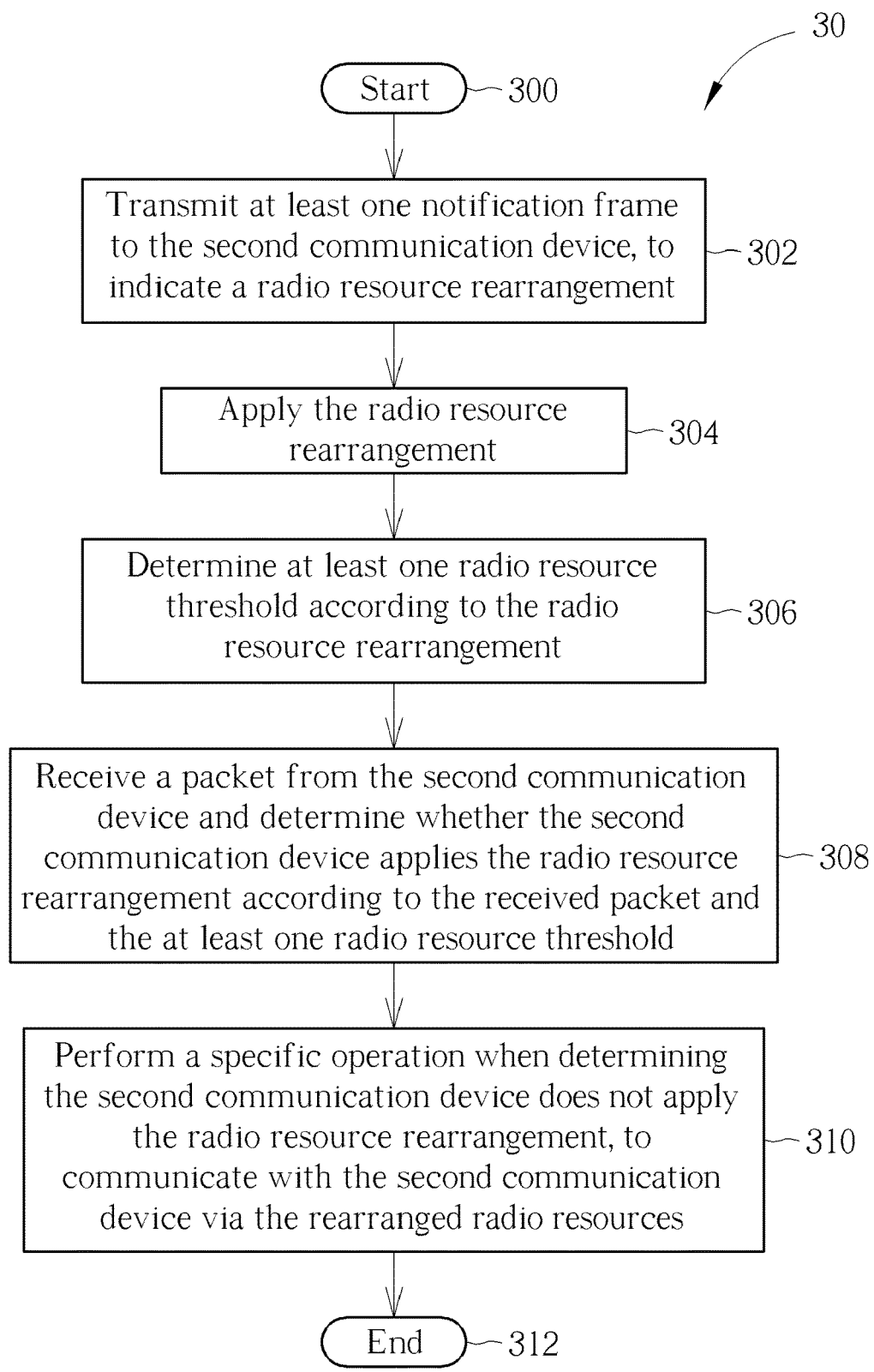
FIG. 3 is a flowchart of a process according to an example of the present invention.

Please refer to FIG. 3, which is a flowchart of a process 30 according to an example of the present invention. The process 30 may be utilized in a first communication device of a wireless communication system for handling a radio resource rearrangement failure of communications with a second communication device in the wireless communication system. For example, the first communication device and the second communication device may be the AP or the communication devices in the WLAN communication system 10 shown in FIG. 1. The process 30 may be compiled into the program code 214 and includes the following steps:

Step 300: Start.

Step 302: Transmit at least one notification frame to the second communication device, to indicate a radio resource rearrangement.

Step 304: Apply the radio resource rearrangement.

Step 306: Determine at least one radio resource threshold according to the radio resource rearrangement.

Step 308: Receive a packet from the second communication device and determine whether the second communication device applies the radio resource rearrangement according to the received packet and the at least one radio resource threshold.

Step 310: Perform a specific operation when determining the second communication device does not apply the radio resource rearrangement, to communicate with the second communication device via the rearranged radio resource.

Step 312: End.

According to the process 30, the first communication device transmits at least one notification frame to the second communication device when intending to perform a radio source rearrangement, to indicate to the second communication device that at least one radio resource of communications will be changed. In an example, the first communication device needs to change the received channels/the number of spatial streams (i.e. the number of used antennas) of the communications between the first communication device and the second communication device when being required to share the antennas with other communication standards (e.g. Bluetooth). Under such a condition, the first communication device may use a very high throughput (VHT) operation mode notification frame specified in 802.11ac or a spatial multiplexing (SM) power save frame specified in 802.11n to indicate to the second communication device that the changed number of antennas. In another example, the first communication device changes a channel bandwidth of the communications between the first communication device and the second communication device in order to mitigate interferences to other radios. In this example, the first communication device may use the VHT operation mode notification frame specified in 802.11ac or a notify channel width frame specified in 802.11n to notify the second communication device of the changed channel bandwidth.

After transmitting the notification frame, the first communication device applies the radio resource rearrangement to adjust at least one radio resource of communicating with the second communication device. At the same time, the first communication device determines at least one radio resource threshold for indicating upper limits of the radio resources for communicating with the second communication device after applying the radio resource rearrangement. For example, the at least one radio resource threshold may comprise the upper limits of the channel bandwidth and the number of spatial streams.

Within an interval after applying the radio resource rearrangement, the first communication device receives a packet from the second communication device and determines whether the second communication device applies the notified radio resource rearrangement. Note that, if the second communication device does not either successfully receive the notification frame or apply the radio resource rearrangement, the first communication device applying the radio resource rearrangement is unable to decode payloads of the packet using the original radio resource arrangement. However, the first communication device is still able to decode a PHY header of the packet using the original radio resource arrangement. Because the PHY header of the packet comprises identification information of the destination communication device (e.g. a station identifier such as a partial association identification (AID) comprising a basic service set identification (BSS ID) or a station identification), the first communication device is able to identify whether the packet is transmitted from the second communication device to itself according to the identify information even if the second communication device does not follow the radio resource rearrangement. When the identification information of the packet matches its own identification, the first communication device identifies the packet belongs to itself and compares radio resource information comprised in the PHY header of the identified packet with the at least one radio resource threshold, to determine whether the second communication device applies the notified radio resource rearrangement.

When the radio resource information of the identified packet satisfies the corresponded radio resource threshold (e.g. the number of spatial steams and the channel bandwidth in the radio resource information are smaller than the upper limits indicated by the at least one radio resource threshold), the first communication device determines the second communication device successfully receives the notification frame and follows the notified radio resource rearrangement. When the radio resource information of the identified packet does not satisfy the radio resource threshold (e.g. the radio resource information exceeds the upper limits indicated by the at least one radio resource threshold), the first communication device determines the second communication device does not either receive the notification frame or apply the notified radio resource rearrangement and performs a specific operation to utilize the rearranged radio resources to communicate with the second communication device. For example, the first communication device may adopt a time division multiplexing (TDM) solution to communicate with the second communication device via the rearranged radio resource. Or, the first communication device may disassociate the second communication device and rebuild connection with the second communication via the rearranged radio resources. As a result, the first communication device can detect whether the radio resource arrangement notification successes and avoid suffering serious transmission failure when rearranging the radio resource.

Figure 4:
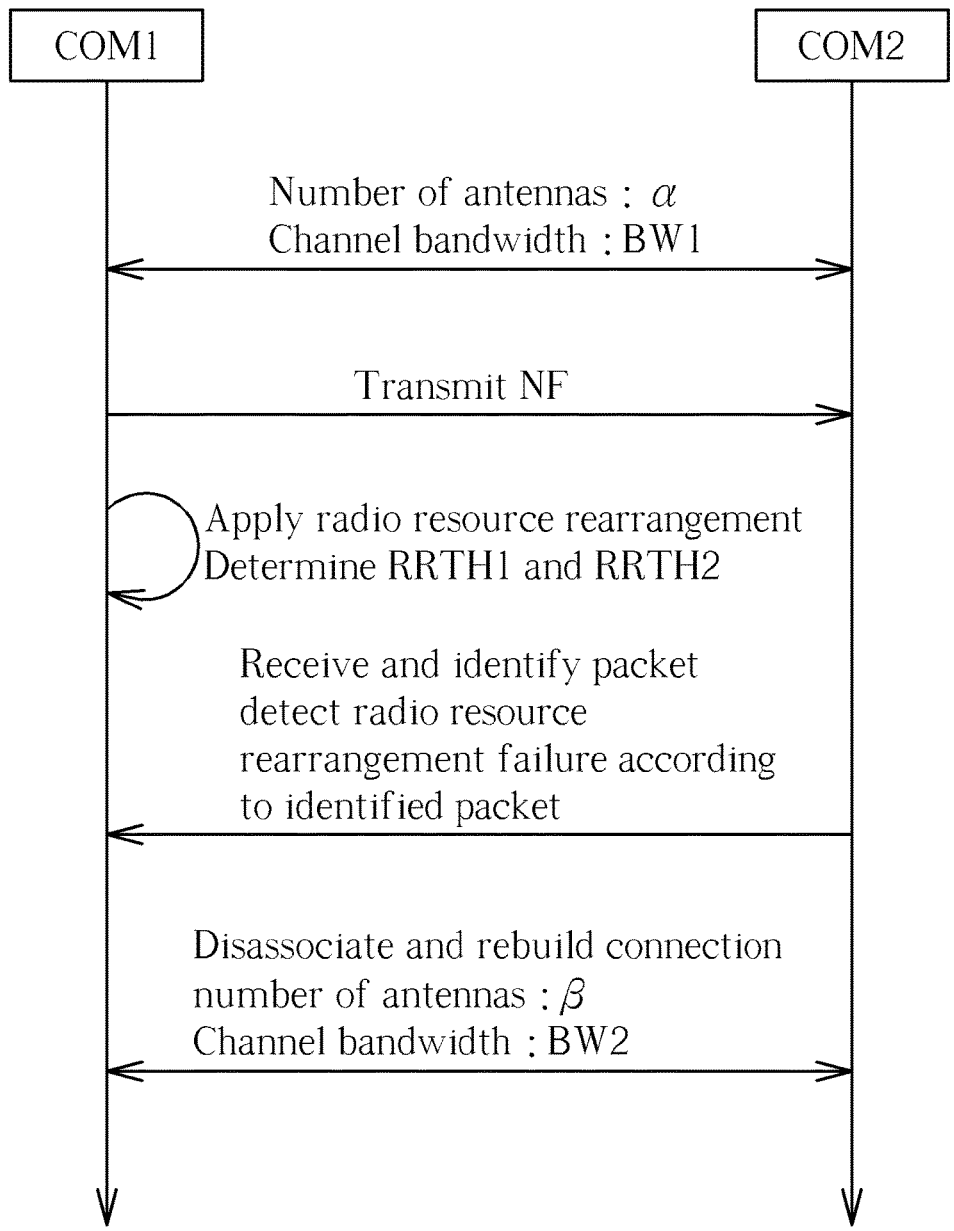
FIG. 4 is a schematic diagram of an example of the present invention.

As to the detailed operations of the process 30, please refer to an example shown in FIG. 4. In FIG. 4, a communication device COM1 communicates with another communication device COM2 via α chains of spatial streams (e.g. by using a antennas) and a channel bandwidth BW1, wherein α is a constant greater than 1. The communication devices COM1 and COM2 may be the AP or the communication devices shown in the WLAN communication system 10 shown in FIG. 1. In order to rearrange the radio resources and to mitigate the interferences to other radios, the communication device COM1 intends to reduce the number of antennas configured for the communication device COM2 from α to β (e.g. β=1) and to shrink the channel bandwidth from the channel bandwidth BW1 to a channel bandwidth BW2 (e.g. from 80 MHz to 40 MHz). Before applying the radio resource rearrangement, the communication device COM1 transmits a notification frame NF to the communication device COM2, to notify the communication device COM2 of the intended radio resource rearrangement.

Next, the communication device COM1 applies the radio resource rearrangement and defines a radio resource threshold RRTH1 indicating that a maximum number of antennas (i.e. the maximum number of spatial streams) used in the communications with the communication device COM2 is β and another radio resource threshold RRTH2 indicating that the maximum channel bandwidth used in the communications with the communication device COM2 is the channel bandwidth BW2.

As abovementioned, the communication device COM1 is still able to decode the PHY header of the packet transmitted by the communication device COM2 even if the communication device COM2 does not follow the notified radio resource rearrangement and adopts the original radio resource arrangement. Thus, the communication device COM1 receives a packet from the communication device COM2 and decodes the PHY header of the received packet to acquire a partial AID and the radio resource information (either the number of spatial streams or the channel bandwidth) of the received packet. If the partial AID of the packet matches its own identity, the communication device COM1 identifies the packet belong itself and compares the radio resource information of the identified packet with the radio resource thresholds RRTH1 and RRTH2. Determining some of the radio resource arrangements of the identified packet do not satisfy the radio resource thresholds RRTH1 and RRTH2 (e.g. the number of spatial streams of the identified packet exceeds the radio resource threshold RRTH1 or the channel bandwidth of the identified packet is greater than the radio resource threshold RRTH2), the communication device COM1 acknowledges that the communication device COM2 does not follow the radio resource rearrangement and adopts a specific operation to communicate with the second communication device via the re-arranged radio resource. In this example, the communication device COM1 disassociates the communication device COM2 and then reconnects the communication device COM2 via the rearranged radio resources (i.e. β antennas and the bandwidth BW2).

Those skilled in the art should readily make combinations, modifications and/or alterations on the abovementioned description and examples. For example, the first communication device may identify whether the packet belongs to itself by recognizing other station identifiers or group identifiers except the partial AID and the BSS ID (e.g. STA_ID or BSS_COLOR specified in 802.11ax) of the received packet. In addition, the abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication apparatus 20.

In the present disclosure, the communication device is able to detect whether the radio resource rearrangement notification fails. When detecting the radio resource rearrangement fails, the communication device would adopt other solutions to use the rearranged radio resource to perform the communications. The communication device therefore would not suffer serious transmission failure when the radio resource rearrangement failure occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling radio resource for a first communication device in a wireless communication system, the method comprising:
    transmitting at least one notification frame to a second communication device, to indicate a radio resource rearrangement;
    applying the radio resource rearrangement;
    determining at least one radio resource threshold according to the radio resource rearrangement;
    receiving a packet from the second communication device and determining whether the second communication device applies the radio resource rearrangement according to the received packet and the at least one radio resource threshold; and
    performing a specific operation when determining the second communication device does not apply the radio resource rearrangement, to communicate with the second communication device via the rearranged radio resources;
    wherein the step of receiving the packet from the second communication device and determining whether the second communication device applies the radio resource rearrangement according to the received packet and the at least one radio resource threshold comprises:
        decoding a physical layer header of the received packet, to acquire identification information;
        identifying the packet when the identification information matches an identification of the first communication device; and
        determining whether the second communication device applies the radio resource rearrangement according to the identified packet and the at least one radio resource threshold.

2. The method of claim 1, wherein the at least one notification frame comprises at least one of a very high throughput (VHT) operation mode notification frame, a spatial multiplexing (SM) power save frame and a notify channel width frame.

3. The method of claim 1, wherein the identification information comprises at least one of a station identifier and a group identifier.

4. The method of claim 1, wherein the step of determining whether the second communication device applies the radio resource rearrangement according to the identified packet and the at least one radio resource threshold comprises:
    decoding a physical layer header of the identified packet, to acquire radio resource information;

comparing the radio resource information with the at least one radio resource threshold; and determining the second communication device does not apply the radio resource rearrangement when the radio resource information does not satisfy the at least one radio resource threshold.

5. The method of claim 1, wherein the step of performing the specific operation when determining the second communication device does not apply the radio resource rearrangement, to communicate with the second communication device via the rearranged radio resources comprises:

adopting a time division multiplexing solution to communicate with the second communication device via the rearranged radio resource.

6. The method of claim 1, wherein the step of performing the specific operation when determining the second communication device does not apply the radio resource rearrangement, to communicate with the second communication device via the rearranged radio resources comprises:

disassociating the second communication device; and
rebuilding connection with the second communication via the rearranged radio resource.

* * * * *